UNITED STATES PATENT OFFICE

ERNEST HARRY RODD AND FREDERICK LAWRENCE SHARP, OF BLACKLEY, MANCHESTER, ENGLAND, ASSIGNORS TO IMPERIAL CHEMICAL INDUSTRIES LIMITED, OF LONDON, ENGLAND

NEW TRIARYLMETHANE DYESTUFFS

No Drawing. Application filed April 13, 1929, Serial No. 354,981, and in Great Britain April 18, 1928.

The introduction of phenyl, tolyl and naphthyl groups into magenta bodies, such as pararosaniline, rosaniline and their homologues by heating with aniline, toluidines, or naphthylamines in presence of a catalyst, has long been practised, and sulphonation of the products gives the well-known alkali blues and soluble blues. Especially with regard to the homologues of rosaniline prepared from mixtures of aniline and o-toluidine, it is well known that the greater the proportion of o-toluidine which enters into reaction, thereby increasing the yield, the less readily can the resulting rosaniline be phenylated, (cf. Lambrecht, Berichte, 1907, 40, 249). In the case of 4:4'-4''-triamino-3:3'-3''-trimethyltriphenylcarbinol (new magenta base color index No. 678) the introduction of phenyl, tolyl and naphthyl groups by means of aniline, toluidine or naphthylamine is very difficult and only poor yields of spirit blues are obtainable.

We have now discovered that if in place of these bases mentioned above which are typical aryl amines, alkoxyarylamines are used, namely, anisidines and phenetidines, there are obtained new and advantageous results. Our new and useful process comprises condensing a magenta body having in the form of the carbinol the probable formula

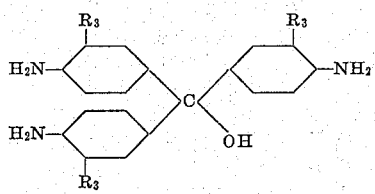

wherein $R_3$ represents hydrogen or a methyl group, with alkoxy amino benzene having the probable formula $H_2N-R-O-R_2$ wherein R represents a benzene residue and $R_2$ represents an alkyl group. In our new process, not only does the reaction proceed very much more smoothly, giving an increased yield, but new condensation products are obtained, which are more readily sulphonated, the resulting acid dyes being particularly valuable for their greenish-blue shades, and their superior fastness to alkaline milling and especially to light.

This discovery is the more important since new magenta, which is the cheapest of the rosanilines to produce but the most difficult to arylate, is obtained from o-toluidine in much higher yield than the lower homologues from mixtures of aniline and o-toluidine. New magenta in the form of the carbinol may be represented by the following formula:

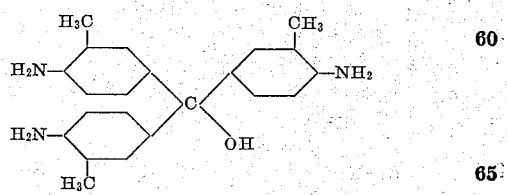

Our invention is illustrated but not limited by the following examples, in which the parts are by weight.

*Example 1.*—10 parts of pararosaniline are mixed with 60 parts of p-phenetidine and 2 parts of benzoic acid and the whole gradually heated to 160° C. This temperature is maintained for two hours, or for such a period as is required to obtain a desired shade. The melt is then added to 400 parts of 5% hydrochloric acid; the spirit blue separates and is removed by filtration, washed and dried. From the filtrate the excess of p-phenetidine is recovered. The exact constitution of the dye is not definitely known, but it is thought to be a mixture of mono-, di-, and triarylated pararosaniline which in the form of the carbinols may be represented by the probable formula

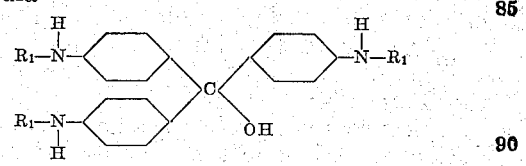

wherein $R_1$ represents hydrogen or the residue

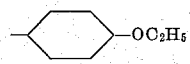

10 parts of the spirit blue are added to 40 parts of concentrated sulphuric acid at such a rate as to prevent the temperature rising above 25° C. When the addition is complete the temperature is gradually raised to 70° C.

and maintained at this point until a sample of the sulphonation mixture is soluble in cold dilute caustic soda. When the desired degree of solubility has been obtained the sulphonation mixture is added to a solution of common salt which precipitates the sulphonic acid. The sulphonic acid is filtered off and converted to its sodium salt by dissolving in caustic soda solution. The resulting neutral solution is evaporated to dryness to obtain the dyestuff, which dyes wool a bright greenish-blue shade.

*Example 2.*—10 parts of technical 4 : 4' : 4''-triamino - 3 : 3' : 3''- trimethyltriphenylcarbinol (new rosaniline), 60 parts of p-phenetidine and 2 parts of benzoic acid are heated together at 160° C. for two hours or for such a period as is required to obtain a given shade. The melt is then poured into dilute hydrochloric acid and the spirit blue which separates is filtered off and dried. From the filtrate the excess of p-phenetidine is recovered. The constitution of the dye is not definitely known but it is thought to be a mixture of mono-, di-, and triarylated new magenta which in the form of the carbinols may be represented by the probable formula

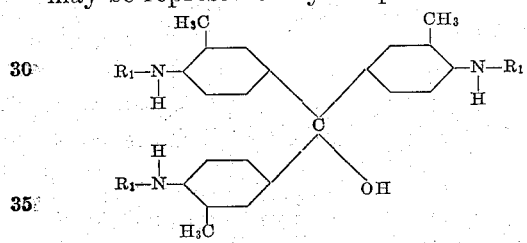

wherein $R_1$ represents hydrogen or the residue

The sulphonation is carried out by adding 10 parts of the spirit blue to 40 parts of concentrated sulphuric acid at a temperature below 25° C. and then heating at 70° C. until a sample is completely soluble in dilute caustic soda solution. The sulphonic acid is precipitated by pouring the mixture into a dilute solution of common salt. It is filtered off, converted into sodium salt by dissolving in caustic soda solution, and the solution evaporated to dryness to obtain the dyestuff.

What we claim and desire to secure by Letters Patent is:

1. A process for the production of new dyes of the triarylmethane series which consists in condensing a magenta body having in the form of the carbinol the probable formula

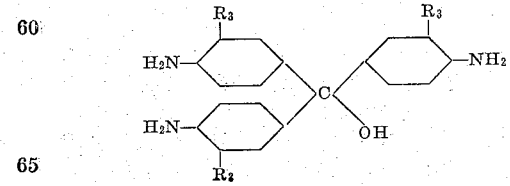

wherein $R_3$ represents hydrogen or a methyl group, with an alkoxyaminobenzene and sulphonating the resultant product.

2. A process for the production of new dyes of the triarylmethane series which consists in condensing pararosaniline with paraphenetidine and sulphonating the resulting product.

3. The step in the production of new dyes of the triarylmethane series which consists in condensing a magenta body having in the form of the carbinol the probable formula

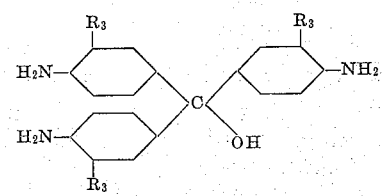

wherein $R_3$ represents hydrogen or a methyl group, with an alkoxyaminobenzene.

4. The step in the production of new dyes of the triarylmethane series which consists in condensing pararosaniline with paraphenetidine.

5. As a new product the dyes of the triarylmethane series which can be obtained by condensing a magenta body having in the form of the carbinol the probable formula

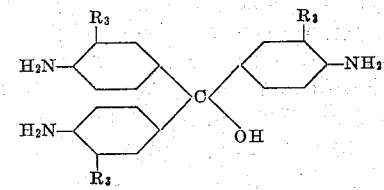

wherein R represents hydrogen or a methyl group, with an alkoxyaminobenzene and sulphonating the resultant product, and which, in the form of its sodium salt, are soluble in water and dye wool blue shades.

6. As a new product the dye of the triarylmethane series which can be obtained by condensing pararosaniline with paraphenetidine and sulphonating the resulting product, and which, in the form of its sodium salt, is soluble in water and dyes wool blue shades.

7. As a new product the compounds which can be obtained by condensing a magenta body having in the form of the carbinol the probable formula

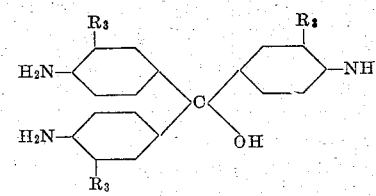

wherein $R_3$ represents hydrogen or a methyl group, with an alkoxyaminobenzene and which are soluble in spirit with a blue solution.

8. As a new product the compound which i..

can be obtained by condensing pararosaniline with paraphenetidine which is soluble in spirit with a blue solution.

9. A process for the production of new dyes of the triarylmethane series which comprises condensing a magenta body having in the form of the carbinol the probable formula

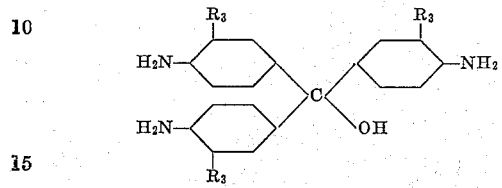

wherein $R_3$ represents hydrogen or a methyl group, with an alkoxy amino benzene having the probable formula

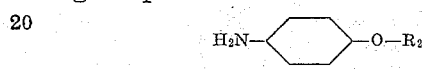

wherein $R_2$ represents an alkyl group and sulphonating the resulting mixture.

10. The step in the production of new dyes of the triarylmethane series which comprises condensing a magenta body having in the form of the carbinol the probable formula

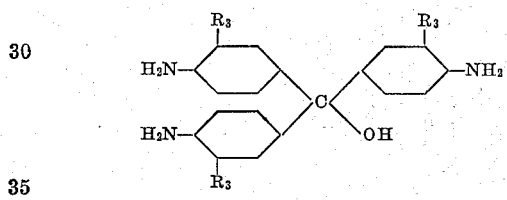

wherein $R_3$ represents hydrogen or a methyl group, with alkoxy amino benzene having the probable formula

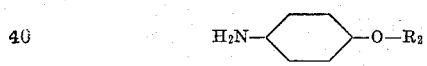

wherein $R_2$ represents an alkyl group.

11. As a new product the dyes of the triarylmethane series which can be obtained by condensing a magenta body having in the form of the carbinol the probable formula

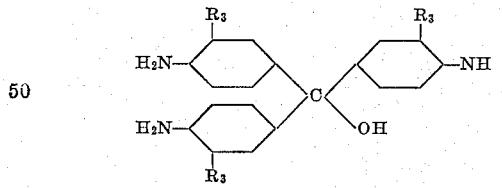

wherein $R_3$ represents hydrogen or a methyl group, with an alkoxy amino benzene having the probable formula

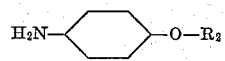

wherein $R_2$ represents an alkyl group and sulphonating the resulting product and which, in the form of its sodium salt are soluble in water and dye wool in blue shades.

12. As a new product the compounds which may be obtained by condensing a magenta body having in the form of the carbinol the probable formula

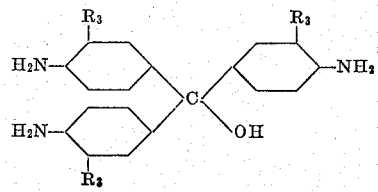

wherein $R_3$ represents hydrogen or a methyl group, with an alkoxy amino benzene having the probable formula

wherein $R_2$ represents an alkyl group, and which are soluble in spirit with a blue solution.

In testimony whereof we affix our signatures.

ERNEST HARRY RODD.
FREDERICK LAWRENCE SHARP.